Figure 1:
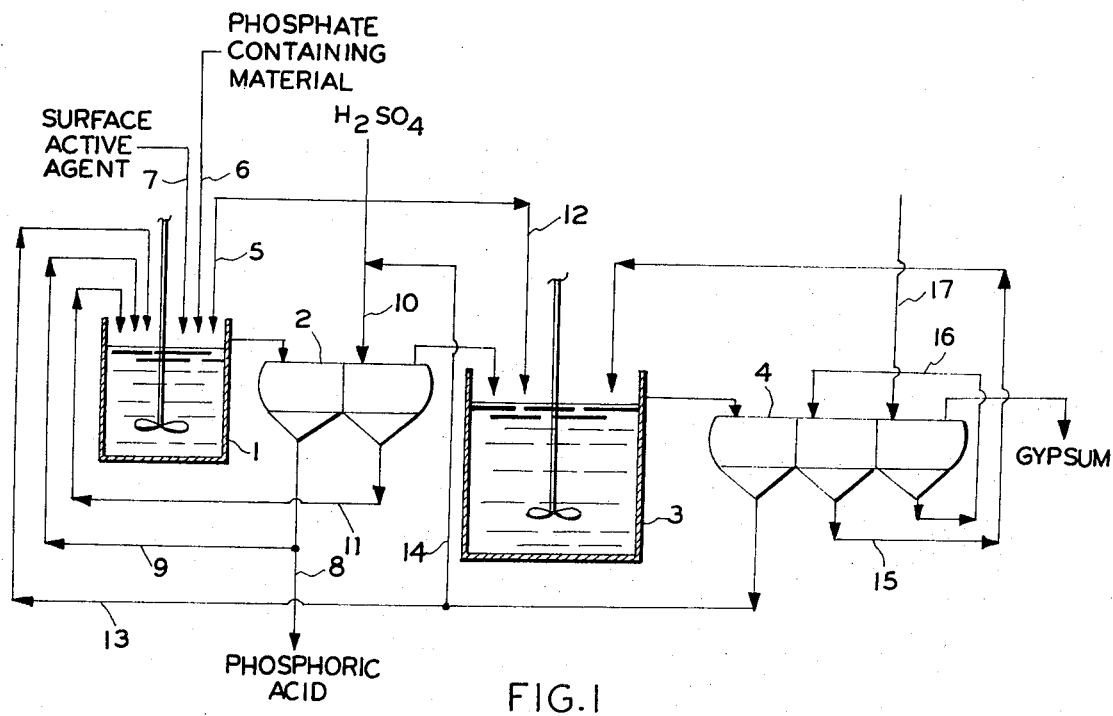

United States Patent
Akazawa et al.

[15] 3,645,677
[45] Feb. 29, 1972

[54] PRODUCTION OF GYPSUM

[72] Inventors: Hakuichi Akazawa; Shigeaki Washio, both of Kakogawa; Keiji Kaji, Akashi; Shisao Fujita, Kakogawa, all of Japan

[73] Assignee: Taki Fertilizer Manufacturing Co., Ltd., Kakogawa, Japan

[22] Filed: Sept. 24, 1969

[21] Appl. No.: 860,770

[30] Foreign Application Priority Data

Sept. 24, 1968 Japan........................43/68292

[52] U.S. Cl.................................23/122, 23/165
[51] Int. Cl.................................C01b 25/22, C01f 11/46
[58] Field of Search.............................23/122, 165

[56] References Cited

UNITED STATES PATENTS

| 3,192,014 | 6/1965 | Leyshon et al.............................23/165 |
| 3,472,619 | 10/1969 | Chelminski et al.......................23/122 |
| 3,505,013 | 4/1970 | Araki et al...............................23/122 |

Primary Examiner—Oscar R. Vertiz
Assistant Examiner—Gregory A. Heller
Attorney—Wenderoth, Lind and Ponack

[57] ABSTRACT

Production of calcium sulfate dihydrate (gypsum) by hydrating calcium sulfate hemihydrate in admixture with a surface active agent, sulfuric acid and phosphoric acid, the mole ratio $H_2SO_4/H_3PO_4$ being greater than 0.4.

8 Claims, 2 Drawing Figures

PRODUCTION OF GYPSUM

This invention relates to a process for producing calcium sulfate dihydrate (which shall be referred to as "gypsum" hereinafter) and more particularly to a process for producing gypsum by hydrating calcium sulfate hemihydrate in a mixture of sulfuric acid and phosphoric acid in a particular predetermined proportion in the presence of a certain surface active agent.

There have been already suggested and practiced many processes wherein a calcium phosphate-containing material, mostly a phosphate rock, is treated with an acid to produce phosphoric acid and gypsum, which are then separated. Recently, one of the most important concerns in this industrial field is to obtain phosphoric acid high in $P_2O_5$ content (for example, of more than 40 percent $P_2O_5$) at a high purity and yield directly from a calcium phosphate-containing material without requiring such aftertreatment as concentrating phosphoric acid. The other is to obtain gypsum which is easy to filter, low in the impurity content, particularly low in the solid solution phosphoric acid content and is applicable to various uses. However, it is very difficult to find a method satisfying both of these requirements simultaneously.

For example, there is known a method of obtaining phosphoric acid of a high concentration by acid-treating a calcium phosphate-containing material under temperature and concentration conditions for producing calcium sulfate hemihydrate. However, in such case, not only will the produced slurry be very viscous but also the produced calcium sulfate hemihydrate will hydrate during the filtration to produce fine needle crystals which would cause difficulty in filtration.

In order to overcome this difficulty there has been proposed a method wherein, in decomposing a calcium phosphate-containing material with sulfuric acid or a mixture of sulfuric acid and phosphoric acid, one or more surface active agents is or are added, to produce calcium sulfate hemihydrate agglomerates, under predetermined concentration and temperature conditions. The agglomerated calcium sulfate hemihydrate is separated from a low-viscosity slurry. This method has advantages that concentrated phosphoric acid can be obtained and that calcium sulfate hemihydrate is separated as agglomerates which are easy to filter, but on the other hand there are some problems in the yield of phosphoric acid, difficulty in the hydration of calcium sulfate hemihydrate, and in recovery of the surface active agent.

There is also known a method (Chem. Eng. Progr. 62 (5), 108, 1966) wherein a calcium phosphate-containing material is treated with a mixture of sulfuric acid and phosphoric acid to produce calcium sulfate hemihydrate, which is then separated from the phosphoric acid solution and is hydrated in a mixture of sulfuric acid and phosphoric acid. However, this method has a problem not only in the filtration of calcium sulfate hemihydrate but also in the crystallization or particularly coarsening of gypsum. Thus, in this method, the hemihydrate is hydrated in a mixture of 20 to 30 percent $P_2O_5$ and 5 to 20 percent $H_2SO_4$. However, in such acid composition, there is no substable (metastable) region for calcium sulfate hemihydrate and therefore the crystallization and crystal growth of gypsum are difficult. Therefore, in said method, there is utilized a circulating slurry. However, there are disadvantages that, with the increase in the concentration of sulfuric acid, an unduly large amount of the circulating slurry will be required and the temperature and concentration control will be difficult.

An object of the present invention is to provide a process for producing gypsum by the hydration of calcium sulfate hemihydrate under a wide range of temperatures and a wide range of compositions of the mixture of sulfuric acid and phosphoric acid.

Another object of the present invention is to facilitate the filtration and separation of gypsum by reducing the slurry viscosity and producing coarse gypsum.

A further object of the present invention is to provide a process for producing gypsum high in purity.

Another object of the present invention is to produce a high concentration phosphoric acid and to increase the recovery rate of phosphoric acid by incorporating the step of producing gypsum into a wet-process for the production of phosphoric acid by the so-called hemihydrate process.

Other objects of the present invention will be apparent from the following description.

Briefly, the present invention provides a process for producing gypsum, which comprises hydrating calcium sulfate hemihydrate in the presence of at least one surface active agent in a mixture of sulfuric acid and phosphoric acid with a mol ratio $H_2SO_4/H_3PO_4$ of more than about 0.4.

The material to be hydrated into gypsum may be any material having substantially the composition of calcium sulfate hemihydrate. For example, there can be used calcium sulfate hemihydrate obtained by treating a calcium phosphate-containing material with an acid and separating the precipitate from the byproduced phosphoric acid. Particularly, the calcium phosphate-containing material is digested by sulfuric acid or a mixture of sulfuric acid and phosphoric acid at a relatively high temperature (for example, above 80° C.) so that the calcium in said material is converted into gypsum hemihydrate with the formation of phosphoric acid. The hemihydrate is filtered and recovered. The particulars of such separating step are mentioned, for example, in U.S. Pat. Nos. 1,902,648 and 2,885,264. The present invention can be applied to any calcium sulfate hemihydrate obtained by such so-called calcium sulfate hemihydrate method.

The method of this invention can be applied also to those products obtained by treating gypsum which has been byproduced from a phosphoric acid producing step by the so-called gypsum process. Thus, such gypsum may be converted to calcium sulfate hemihydrate under proper conditions, for example, by dry-heating the same, or under proper heating conditions in a mixed acid to be used in the present invention described hereinafter. Further, the present invention can be applied also to gypsum discharged in various industries, for example, in producing sodium sulfate, salt, titanium oxide or citric acid or to gypsum byproduced in the treatment of a waste acid (such as a mineral waste acid or pickling waste acid). In some of these cases, the operation may be controlled as to produce calcium sulfate hemihydrate, which may be subjected to the method of this invention.

In carrying out the present invention, the above-mentioned calcium sulfate hemihydrate material is put into a mixed acid of a predetermined composition so as to be dispersed or dissolved therein. The mixed acid should be a mixture of sulfuric and phosphoric acid. In order to attain the objects of the present invention, its composition must be such that the mol ratio $H_2SO_4/H_3PO_4$ is higher than about 0.4, preferably higher than 0.5. Further, it is preferable that the acid concentration is in a range of about 20 to 40 percent of $H_2SO_4 + P_2O_5$. When the above-mentioned ranges are remarkably deviated from, various adverse influences on the hydration of calcium sulfate hemihydrate will be observed. Thus, for example, calcium phosphate contained in the crystal lattice of the calcium sulfate hemihydrate will not be satisfactorily removed, it will take a long time to hydrate the calcium sulfate hemihydrate and the rate of the surface active agent adsorbed in the gypsum will become comparatively high. Further, if the mol ratio $H_2SO_4/H_3PO_4$ becomes higher than about 5.0, the effect of the surface active agent (to be explained later) will not be noticeable.

In the present invention, calcium sulfate hemihydrate is hydrated in the above-mentioned mixed acid under a proper temperature condition. The important feature of this invention is that the hydration is carried out in the presence of one or more surface active agents.

As such surface active agents, there can be enumerated one or more of alkylarylsulfonic acids, alkylnaphthalenesulfonic acids, sulfuric esters of higher alcohols and their salts and derivatives. Alkylbenzenesulfonic acid having an alkyl group with four to 15 carbon atoms is preferable among them.

Whether such surface active agent is added to calcium sulfate hemihydrate or is added into the mixed acid, the effect will be the same.

The amount of the surface active agent may vary depending on the kind of the agent or other treating conditions, but generally may be about 0.005 to 5.0 percent by weight or more, preferably about 0.01 to 1.0 percent by weight based on the weight of the calcium sulfate hemihydrate. If the amount of the surface active agent is larger than that, it is not only uneconomical but also no increased in effect will be recognized.

In hydrating calcium sulfate hemihydrate in the presence of such surface active agent in the mixed acid, it is necessary to keep the temperature of the system in a range in which gypsum can be produced. In the present invention, such range can be wide. The other conditions, particularly the composition and concentration of the mixed acid would influence the hydrating temperature. However, it is preferable to conduct the hydration at a temperature of about 40° to 95° C. For example, when the concentration of the mixed acid is about 30 percent and the mol ratio $H_2SO_4/H_3PO_4$ is 1.0, the hydrating temperature will be in such a wide range as about 45° to 70° C. On the other hand, when no surface active agent in employed, the hydrating temperature condition to coarsen the gypsum crystals will be limited to be near the transition temperature of 70° C. and the temperature condition will be in a range so strict as to very difficult to practice.

Generally, there is a tendency that if the amount of the surface active agent increases, the lower limit of the hydrating temperature will be extended downward, while if the mol ratio and concentration of the mixed acid rises, there will also be the same tendency.

The calcium sulfate hemihydrate subjected to the step of the present invention will soon begin to hydrate within 10 minutes after the treatment is started. If the conditions are properly selected, the hydration will be substantially complete in 20 to 30 minutes and the gypsum will grow into thick columnar macrocrystals. Industrially the treatment according to the present invention can be completed within 3 to 5 hours.

The resulting gypsum crystals are easy to filter so that it is possible to separate them simply with an ordinary filtering machine.

In order to demonstrate the effect of the surface active agent in the present invention, the following experiments were conducted.

Thus, each of various amounts of an alkylbenzene sulfonic acid (ABS) having an alkyl group with 12 carbon atoms was added to 800 g. of a mixture (mol ratio of $H_2SO_4/H_3PO_4$:0.93) of 14.99 percent $P_2O_5$ and 15.67 percent $SO_3$. Then 80 g. of calcium sulfate hemihydrate containing 0.8 g. of gypsum were added thereto while keeping the mixture at 50° C. and were hydrated with stirring. The resulting gypsum was separated and was analyzed or observed. The results are shown in Table 1.

TABLE 1

| Amount of ABS (g.) | Combined water* (%) | | | | Microscopic observation |
|---|---|---|---|---|---|
| | Hydrating time | | | | |
| | 10 min. | 30 min. | 1 hr. | 3 hrs. | |
| 0 | 19.7 | 20.6 | 20.8 | 20.6 | Needle microcrystals |
| 0.08 | 9.7 | 20.6 | 20.8 | 20.8 | Columnar macrocrystals |
| 0.40 | 9.1 | 20.6 | 20.7 | 20.7 | Columnar macrocrystals |

*The combined water was measured as follows: Thus 20 c.c. of the gypsum suspension at the end of the indicated hydrating time were taken and quickly filtered under suction. The filter cake was washed with ethyl alcohol three times and dried at 45° C. for 5 hours and then calcinated at 280° C. for 3 hours. Then the content of combined water was measured.

As apparent from the results in Table 1, when ABS is not added, the hydrated calcium sulfate obtained was needle microcrystals which are very difficult to filter. On the other hand, in the cases where the surface active agent was added, it was completely hydrated in 36 minutes and the resulting hydrated crystals were columnar or rice-grain-shaped macrocrystals.

The effect of the surface active agent is related with the composition of the mixed acid to be used as described above. Thus, each of the below mentioned five kinds of acids or mixed acids containing 0.4 g. of ABS having an alkyl group with 12 carbon atoms was kept at 50° C. and 80 g. of calcium sulfate hemihydrate (which was calcium sulfate hemihydrate at the time of wet-process phosphoric acid production) containing 0.8 g. of gypsum were added thereto and hydrated with stirring. The results are as shown in Table 2.

TABLE 2

| | Control | Examples of the invention | | | Control |
|---|---|---|---|---|---|
| Composition of mixed acid: | | | | | |
| $SO_3$ (percent) | 29.51 | 20.44 | 15.67 | 10.83 | 0 |
| $P_2O_5$ (percent) | 0 | 5.02 | 14.99 | 20.01 | 30.4 |
| $H_2SO_4/H_3PO_4$ mol ratio | 00 | 3.69 | 0.93 | 0.48 | 0 |
| | Combined water (percent) | | | | |
| Hydrating time (min.): | | | | | |
| 10 | 13.4 | 14.6 | 9.1 | 11.5 | 10.2 |
| 30 | 20.4 | 19.2 | 20.6 | 19.7 | 18.4 |
| 60 | 20.6 | 20.7 | 20.7 | 20.8 | 20.6 |
| 180 | 20.8 | 20.8 | 20.7 | 20.7 | 20.7 |
| Microscopic observation | (1) | (2) | (2) | (2) | (3) |
| Amount (percent) of solid-solution phosphoric acid 4 | 0 | 0.0001 | 0.002 | 0.03 | 1.2 |

1 Needle micro-crystals.
2 Plate columnar crystals.
3 Laminar crystals.
4 The solid-solution phosphoric acid content was quantitatively determined by drying the gypsum at 45° C. for 5 hours, boiling 20 g. of the dried sample for 30 minutes with stirring in 200 g. of water containing 5 cc. of aqua regia, filtering, washing and drying the same. Then 1.0000 g. of the dried sample was dissolved in 500 cc. of distilled water containing 5 cc. of HCl and the content of $P_2O_5$ in the solution was measured by colorimetry.

As apparent from Table 2, when the mol ratio of $H_2SO_4/H_3PO_4$ is in the range of 0.4 to 5.0 not only will the crystals grow well to become plate columnar crystals but also the amount of solid solution phosphoric acid will be very small. On the other hand, when the mol ratio is smaller than that, the crystals will not be thick enough and the amount of solid solution phosphoric acid will be so large that a product suitable for making cement will not be obtained. When said mol ratio is large than that, the desirable influence of the surface active agent will be reduced and needle crystals so fine as to be difficult to filter will tend to be produced. Therefore, the mol ratio in the range of about 0.4 to 5.0 is important in this invention.

As described above, according to the process of this invention, the hydration is possible in a wide temperature range. In contrast, where no surface active agent is used, troublesome temperature control will be required.

For example, to 800 g. of a mixed acid (mol ratio of $H_2SO_4/H_3PO_4$:0.93) of 14.99 percent $P_2O_5$ and 15.67 percent $SO_3$ containing 0.4 g. of ABS having an alkyl group with 12 carbon atoms were added 80 g. of calcium sulfate hemihydrate containing 0.8 g. of gypsum and the mixture was stirred for hydrating at different temperatures. The results are shown in Table 3.

TABLE 3

| Hydrating temperature (°C.) | Combined water (%) | | | | Microscopic observation |
|---|---|---|---|---|---|
| | Hydrating time (min.) | | | | |
| | 10 | 30 | 60 | 180 | |
| 43 | 8.4 | 20.8 | 20.8 | 20.7 | Needle crystals |

| | | | | | |
|---|---|---|---|---|---|
| 50 | 9.1 | 20.6 | 20.7 | 20.7 | Plate columnar macrocrystals |
| 65 | 8.2 | 8.4 | 12.6 | 20.5 | Short columnar macrocrystals |
| 70 | 8.4 | 8.5 | 9.5 | 10.4 | Short columnar but not substantially hydrated |

As apparent from the above table, the temperature at which the effect of ABS is realized is 50° or 65° C. Under the conditions of this example, the effect of ABS can not be expected at 43° C. Further, the temperature of 70° C. is the upper limit in which there is realized the effect of the surface active agent under these conditions.

In the absence of ABS, with the above-mentioned mixed acid composition, the crystal growth was impossible. But, in the present invention, there is an industrial significance that, due to the action of ABS, the operation can be carried out effectively over a wide range of a temperature difference of at least 15° to 20° C. at least.

As explained before, the present invention can be applied to the hydration of calcium sulfate hemihydrate produced from various sources. Further, gypsum can be converted by the proper method to semihydrate, which can be subjected to the hydrating treatment of this invention.

The hydrating treatment of this invention has various advantages as follows:
1. The conditions of treating temperature and mixed acid composition can be varied over a wide range.
2. The hydrated grown gypsum is plate columnar or rice-grain-shaped macrocrystals and the slurry is low in viscosity so that it is easy to filter and separate the crystals.
3. The resulting gypsum is very high in purity.
4. The greater part of the used surface active agent is present in the filtrate and can be reused so that substantially no new supply of it is required.

In another aspect of the present invention, the above hydration step may be combined with the treatment of calcium sulfate hemihydrate or gypsum discharged out of a wet-process phosphoric acid producing step. In this way, the following additional advantages can be obtained:
1. The present hydration step can be combined as such with a wet-process phosphoric acid producing equipment by a hemihydrate process. Even in case the hydration step of the invention is combined with a wet-process phosphoric acid producing equipment by a gypsum process, the present invention can be worked simply (for example, by merely semihydrating the gypsum in the mixed acid of the present invention).
2. The production of a high concentration phosphoric acid which is an advantage of a hemihydrate process is still possible.
3. In the gypsum obtained by hydration, the amount of impurities or particularly solid solution phosphoric acid is so small to be less than about 0.05 percent or usually less than 0.01 percent. Therefore, the resulting gypsum is very useful for such uses as not only for gypsum boards and gypsum plasters but also for cement setting retardants.
4. The recovery rate of $P_2O_5$ in the wet-process phosphoric acid production by a hemihydrate process can be increased greatly (for example, to be more than 98 percent $P_2O_5$) by the combination with the step of the present invention.

Thus the present invention also provides a process for producing gypsum comprising decomposing a calcium phosphate-containing material into phosphoric acid and calcium sulfate hemihydrate in an acid in the presence of one or more surface active agents, separating them from each other and then hydrating said calcium sulfate hemihydrate containing said surface active agent with or without the addition of the above-mentioned surface active agent in a mixed acid of sulfuric acid and phosphoric acid with a mol ratio $H_2SO_4/H_3PO_4$ of more than 0.4.

Figure 2:
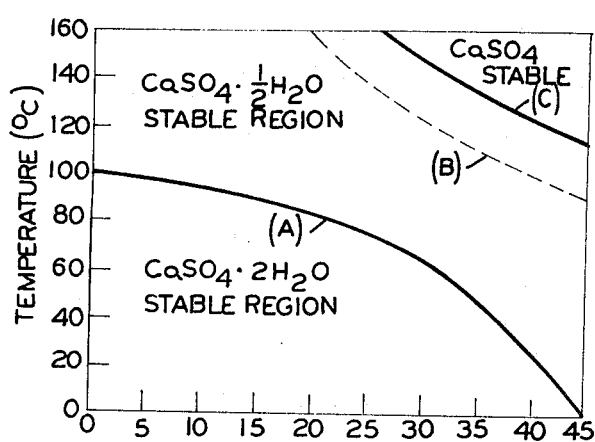

This aspect of the invention will be explained in more detail as follows by referring partly to the accompanying drawings wherein:

FIG. 1 is a flow sheet of a process of this invention; and
FIG. 2 is a diagram showing various calcium sulfate stable regions in various $P_2O_5$ concentrations in the presence of a surface active agent.

In decomposing a phosphate-containing material with an acid, the material may be reacted, under such wide temperature and concentration ranges within the calcium sulfate hemihydrate stable zone shown in FIG. 2 with sulfuric acid or a mixture of sulfuric acid and other acid in the presence of one or more surface active agents. The resulting slurry shows a low viscosity such as about ⅓ that in the case where the surface active agent is not added. It is very easy to filter and separate the produced calcium sulfate hemihydrate. Further, the phosphoric acid obtained as a filtrate can be of a $P_2O_5$ concentration of more than 40 percent by properly selecting the condition of the decomposition. Thus, when it is desired to obtain phosphoric acid having such $P_2O_5$ concentration, it is preferable to conduct the decomposition at a temperature of 70° to 90° C. The calcium sulfate hemihydrate thus obtained is in the form of microcrystals which are stiff nonhydratable coagulation due to the action of the surface active agent, and the greater part (for example, 99 percent) of the added surface active agent is adsorbed by the crystals.

The amount of sulfuric acid to be used in the above-mentioned decomposition step is in a range of about 95 to 103 percent of the chemically theoretical amount required to precipitate the calcium in the calcium phosphate-containing material as calcium sulfate hemihydrate. However, in consideration of the decomposing velocity and decomposing rate of the material and the purity (particularly the amount of $SO_4$ ions) of phosphoric acid to be obtained, it is preferable to use sulfuric acid in an amount less than that theoretically required. Under such condition, the time required for the decomposition can be remarkably reduced. Thus, the filtration can be carried out in about to 2 hours after the beginning of the decomposition reaction, and the amount of sulfuric acid in the filtrate (phosphoric acid) is such as can not be substantially detected in the analysis.

A surface active agent to be used in the acid decomposition, any of those mentioned before can be used. The amount of the surface active agent is in a range of about 0.1 to 1.2 percent on the amount, for example, of a phosphate rock powder used. If more than that is used, the decomposition rate of the phosphate rock powder will tend to reduce. The decomposition rate is about 95 percent (the recovery rate in an ordinary hemihydrate process is less than 90 percent). However, it has been found that, by the redissolution of the hemihydrate and the circulating use of the filtrate in the later described hydrating step, the $P_2O_5$ recovery rate in the entire step is elevated to be more than about 98 percent.

The slurry resulting from the decomposing step may be subjected to a proper solid-liquid separation such as filtration so that product phosphoric acid may be obtained and calcium sulfate hemihydrate agglomerates may be stably recovered. In an ordinary conventional method, it is required to wash the separated hemihydrate to increase the recovery yield of phosphoric acid. However, in the present invention, the subsequent hydrating step can be immediately applied without requiring such washing.

The calcium sulfate hemihydrate resulting and recovered from the above-mentioned decomposing step contains a considerable amount of the surface active agent added at the decomposing step. Therefore, in most cases it is unnecessary to add a surface active agent to calcium sulfate hemihydrate in subjecting the same to the subsequent hydration step according to this invention.

The conditions for the hydrating step may be the same as explained before. Therefore, if there is contained more than about 0.005 percent of the surface active agent in the calcium sulfate hemihydrate discharged from the decomposing step, it will not be necessary to add any additional amount of the surface active agent. The gypsum obtained by the hydration is far weaker in adsorbability of the surface active agent than calcium sulfate hemihydrate and therefore the surface active agent will mostly move into the filtrate when the hydration product is filtered. The filtrate or the mixed acid containing such surface active agent may be circulated back to the decomposing step or the first filtering step, and therefore the greater part (for example, more than 99 percent of the surface active agent will be reutilized so that there is an advantage that substantially no new supply of the surface active agent is required.

In carrying out the series of steps, it is desirable to employ an apparatus as shown in FIG. 1.

A properly crushed calcium phosphate-containing material, for example, phosphate rock and a surface active agent in an amount of 0.1 to 1.2 percent on said material and a circulating acid (a concentrated phosphoric acid solution and/or a mixed acid of phosphoric acid and sulfuric acid) are charged into a decomposing tank 1 through respective feed pipes 5, 6, 7, 9 and 13. The mixture is reacted at a temperature and concentration under which calcium sulfate hemihydrate can be produced. Thus a slurry containing a concentrated phosphoric acid and calcium sulfate hemihydrate crystal agglomerates are formed. As the surface active agent is contained in the circulating acid as described later, in determining the amount of the above-mentioned surface active agent, the amount conveyed by this circulation must be considered.

In conducting the decomposition in the presence of the surface active agent, the substable region of calcium sulfate hemihydrate which can not exist in an ordinary semihydrate-producing step will be present in a wide range enclosed with the curves A and B shown in the accompanying FIG. 2. Therefore, conditions satisfying this range may be selected. Particularly, when a concentrated phosphoric acid (for example, of about 40 to 45 percent $P_2O_5$) is to be obtained, the temperature may be, for example, 65° to 95° C.

Usually, the decomposition in the decomposing tank 1 is completed in about 1 to 2 hours to produce a low viscosity slurry of the above mentioned composition. This slurry is transferred to a first separator 2 by overflowing. For the first separator 2, there may be used not only a horizontal belt filter, but also a filter of any other type (such as, for example, horizontal rotary type or cylindrical vacuum type). In some cases, a centrifugal separator may also be used. The above slurry which has flowed into the first section of the first separator 2 is immediately separated into solid and liquid phases. The liquid phase or phosphoric acid is discharged from the first separator 2 through a conduit pipe 8, while calcium sulfate hemihydrate crystal agglomerates containing more or less impurities (such as phosphoric acid, undecomposed phosphate and surface active agent) is transferred to the second section of the first separator 2. The greater part of the surface active agent initially added has been adsorbed by the calcium sulfate hemihydrate and does not escape into the phosphoric acid. The discharged concentrated phosphoric acid is of about 40 to 45 percent $P_2O_5$ content. The greater part of this phosphoric acid is recovered as a product but a smaller part is circulated back the above-mentioned decomposing tank 1 through the conduit pipe 9 and is used for the decomposition of the freshly charged calcium phosphate-containing material.

The calcium sulfate hemihydrate crystal (agglomerates) transferred to the second section of the first separator 2 is washed with an acid liquid containing at least one of sulfuric acid and phosphoric acid. In the embodiment shown, concentrated sulfuric acid is fed through a conduit pipe 10 from outside the system and at the same time a mixture of sulfuric acid and phosphoric acid returned from the first section of the later-described second separator 4 is fed through conduit pipes 14 and 10. As it is possible to properly vary the composition of the washing acid by regulating the rates of feeds, the acid composition to be deposited on the calcium sulfate hymihydrate can be made substantially the same as of the mixed acid in the later described hydrating tank 3. This is favorable in maintaining the mixed acid in the later described hydrating tank 3 at a predetermined constant composition.

The calcium sulfate hymihydrate crystals discharged from the second section of the first separator 2 is transferred to the hydrating tank 3 and is dispersed under stirring into a mixture of sulfuric acid and phosphoric acid in a predetermined composition range. As explained before, this mixed acid has a composition of a mol ratio $H_2SO_4/H_3PO_4$ of more than about 0.4 and has a total acid concentration ($H_2SO_4 + P_2O_5$) of about 20 to 40 percent.

The composition and concentration of the mixed acid may be adjusted by the concentrated sulfuric acid to be fed through a conduit pipe 12 and the washing acid to be fed through a conduit pipe 15 from the second section of the later described second separator. In order to adjust the temperature of the mixed acid in the hydrating tank 3, a cooler may be provided in the upper part of the tank. If desired the tank 3 may be provided with a stirrer.

As explained before, it is necessary, according to this invention, that a proper amount of a surface active agent be present in the hydrating tank 3. However, since the calcium sulfate hemihydrate slurry from the first separator 2 has adsorbed substantially the greater part of the surface active agent added at the decomposing step as described above, usually there is seen no need of feeding additional surface active agent in the hydrating tank 3.

In the hydrating tank 3, the calcium sulfate hemihydrate is hydrated into gypsum in which the content of solid solution phosphoric acid is extremely little. The crystals are sufficiently grown. The hydrating temperature may be held at about 40° to 95° C. The hydration is completed within about 30 minutes to 5 hours at most.

The hydrated slurry is introduced into the second separator 4. It is possible that the structure of this separator is the same as of the first separator 2. In the first section of the second separator 4, the slurry is filtered to separate the grown gypsum crystals and mixed acid. The former is moved into the second section and the latter is made to flow again into the above mentioned decomposing tank 1 and/or the second section of the first separator 2. In this case, the greater part (for example, more than 90 percent) of the surface active agent is conveyed into the filtrate or mixed acid and substantially no surface active agent remains in the gypsum. Therefore, the greater part of the surface active agent may be reutilized. The gypsum crystals in the second section are further washed with the dilute acid coming through a conduit pipe 16 from the third section and then moved to the third section, while the washing acid is returned to the hydrating tank 3. In the third section, the gypsum is finally washed with water fed from outside the system through a conduit pipe 17. Meanwhile, any remaining surface active agent is further sufficiently removed (for example, by more than 99 percent). By the way, it is not always necessary that the above-mentioned separating step in the second separator 4 should consist of the three sections.

The resulting gypsum is plate columnar or rice-grain-shaped macrocrystals, contain no such impurities as a surface active agent and solid solution phosphoric acid (the content of solid solution phosphoric acid is less than 0.01 percent) and is applicable to various uses.

According to this process, the amount of the circulating acid to be used for the decomposition of phosphate rock may be greatly reduced. Thus, in a conventional phosphoric acid producing process, it is usually necessary to use a circulating acid containing phosphoric acid 4 to 5 times that in the phosphate rock, whereas, in the present invention, it is possible to use a circulating acid containing phosphoric acid in an amount about half that.

The above procedure may be slightly modified. Thus, the calcium phosphate-containing material is subjected to the acid decomposition in the presence of at least one surface active agent. Then, without separating the hemihydrate, the molar ratio $H_2SO_4/H_3PO_4$ in the acid medium is adjusted to be more than 0.4. The total acid concentration ($H_2SO_4 + H_3PO_4$) is also adjusted to be 20 to 40 percent. In this way the slurry resulting from the acid-decomposition step may be subjected to the hydration of this invention to produce gypsum.

The invention will be further explained by the following examples.

EXAMPLE 1

A mixed acid, 800 g., (mol ratio $H_2SO_4/H_3PO_4$:0.93) of 14.99 percent $P_2O_5$ and 15.07 percent $SO_3$ containing 0.4 g. of ABS having an alkyl group with 12 carbon atoms was kept at a temperature of 60° C. and 80 g. of calcium sulfate hemihydrate containing 0.8 g. of gypsum were added thereto and the mixture was stirred for conducting the hydration.

In order to investigate the rate of hydration, 20 cc. of the suspension were taken out at different times and quickly filtered under suction. The filter cake was washed with ethyl alcohol three times, then dried at 45° C. for 5 hours and fired at 280° C. for 3 hours to measure the combined water content. The results are as shown in the following table. Under the microscopic observation, the gypsum hydrated for 60 minutes was of short columnar macrocrystals. Further, the microscopic observation showed the formation of needle crystals after the lapse of 60 minutes in the treatment of calcium sulfate hemihydrate under the same condition except the absence of ABS.

| Hydrating time (min.) | 10 | 30 | 60 | 120 |
|---|---|---|---|---|
| Combined water (%) | 7.9 | 8.2 | 20.5 | 20.9 |

Further, the gypsum hydrated as above by the present invention was filtered under suction in the same manner and was washed with water. The ABS in the resulting gypsum was 0.0038 percent. Thus, the amount of ABS remaining in the gypsum was 0.8 percent of the total ABS initially added.

EXAMPLE 2

A mixed acid, 800 g., of 14.99 percent $P_2O_5$ and 15.67 percent $SO_3$ containing 0.2 g. of a mixture of ABS having an alkyl group with 12 carbon atoms and polyethylene glycol was kept at 65° C. and 80 g. of calcium sulfate hemihydrate containing 0.8 g. of gypsum were added thereto and the mixture was stirred to conduct the hydration.

The rate of hydration was determined in the same manner as in Example 1. The results are as follows:

| Hydrating time (min.) | 10 | 30 | 60 | 180 |
|---|---|---|---|---|
| Combined water (%) | 8.1 | 9.2 | 12.8 | 20.7 |

EXAMPLE 3

There was added 0.5 g. of ABS having an alkyl group with 12 carbon atoms to a mixed acid of 200 g. of circulating phosphoric acid of 40 percent $P_2O_5$ and 118 g. of 73.5 percent sulfuric acid at 90° C., and then 100 g. of phosphate rock of a composition of 31.4 percent $P_2O_5$, 47.2 percent CaO, 1.60 percent $R_2O_3$ and 3.88 percent F were gradually added thereto, and the mixture was further stirred for 1 hour to conduct the decomposition reaction. The viscosity of the resulting slurry in which calcium sulfate hemihydrate agglomerates are suspended was 33 centipoises at 60° C. The slurry could be quickly filtered with a vacuum pump suction filter to obtain 185 g. of calcium sulfate hemihydrate and a phosphoric acid of a concentration of 40.5 percent $P_2O_5$. The obtained calcium sulfate hemihydrate contained 6.35 percent combined water and 0.25 percent ABS.

The resulting calcium sulfate hemihydrate containing the ABS was added to 1,000 g. of a mixed acid (mol ratio $H_2SO_4/H$: 0.59) of 10.3 percent $SO_3$ and 15.4 percent $P_2O_5$ held at 70° C. and 2 g. of gypsum were further added thereto with stirring to conduct the hydration.

After 2 hours, the product was filtered under suction and the filter cake was washed with water. It was easy to filter and wash. The resulting gypsum was in the form of macrocrystals and contained 19.6 percent combined water and 0.01 percent solid solution phosphoric acid.

EXAMPLE 4

0.5 g. of a mixture of ABS having an alkyl group with 12 carbon atoms and the sulfuric acid ester of stearyl alcohol was added to a mixed acid of 200 g. of circulating phosphoric acid of 40.4 percent $P_2O_5$ and 118 g. of 73.5 percent sulfuric acid at 80° C. and then 100 g. of phosphate rock of a composition of 31.4 percent $P_2O_5$, 47.2 percent CaO, 1.6 percent $R_2O_3$ and 3.88 percent F were gradually added thereto. The mixture was further stirred for 1.5 hours to conduct the decomposition. The resulting slurry containing suspended calcium sulfate hemihydrate agglomerates had a viscosity of 51.8 centipoises at 60° C. The slurry could be quickly filtered under suction. The resulting agglomerated calcium sulfate hemihydrate contained 6.46 percent combined water and 0.23 percent of the mixture of the ABS and stearic ester. The yield was 188 g.

The calcium sulfate hemihydrate containing the ABS and stearic ester thus obtained was added to 600 g. of a mixed acid (mol ratio $H_2SO_4/H_3PO_4$: 0.93) of 14.99 percent $P_2O_5$ and 15.67 percent $SO_3$ held at 60° C. and 5 g. of gypsum were added thereto with stirring to conduct the hydration.

After 1.5 hours of the recrystallization, the hydrated product was filtered under suction and washed with water. The gypsum crystals thus obtained were easy to filter and wash. The macrocrystalline gypsum contained 19.3 percent combined water and 0.003 percent solid solution phosphoric acid. The crystals were short and columnar in shape.

EXAMPLE 5

To a mixed acid of 40.4 percent $P_2O_5$ phosphoric acid 200 g., and 73.5 percent sulfuric acid, 118 g., held at 90° C. was added 0.55 g. of an alkyl (12 carbon atoms) benzene sulfonic acid. To this mixture were gradually added 100 g. of powdered phosphate rock ($P_2O_5$ 31.4 percent, CaO 47.2 percent, $R_2O_3$ 1.60 percent, F 3.88 percent) and the mixture was stirred for 1 hour to conduct the decomposition. Then 350 g. of sulfuric acid (28.1 percent) were added thereto while stirring at 65° C. and there were further added 1.5 g. of gypsum to conduct the hydration reaction. After 1 hour recrystallization, the product was filtered under suction and the filter cake was washed with water. The filtration and washing were easy. The resulting gypsum macrocrystals contained 0.01 percent solid solution phosphoric acid and 19.5 percent combined water. The crystals were short and columnar in shape.

What we claim is:

1. A process for producing gypsum which comprises hydrating calcium sulfate hemihydrate in a mixture of 0.005 to 5.0 percent by weight, based on the weight of the calcium sulfate hemihydrate, of at least one surface active agent selected from the group consisting of alkylarylsulfonic acids, alkylnaphthalenesulfonic acids, sulfuric acid esters of higher alcohols and salts thereof, sulfuric acid and phosphoric acid at a temperature of 40° to 95° C., the mol ratio $H_2SO_4/H_3PO_4$ being greater than about 0.4.

2. A process according to claim 1 wherein the total concentration of the mixture of acids is 20 to 40 percent.

3. A process according to claim 1 wherein the surface active agent is selected from the group consisting of alkylarylsulfonic acids and alkali metal salts thereof.

4. A process according to claim 1 wherein the mol ratio $H_2SO_4/H_3PO_4$ is 0.5 to 5.0:1.

5. A process according to claim 1 wherein the calcium sulfate hemihydrate is obtained by decomposing a calcium phosphate-containing material in sulfuric acid or in a mixture of sulfuric and phosphoric acid.

6. A process according to claim 1 wherein phosphoric acid and calcium sulfate hemihydrate are produced by decomposing a calcium phosphate-containing material in sulfuric acid or in a mixture of sulfuric and phosphoric acid in the presence of said surface active agent, and the hemihydrate is subjected to said hydration.

7. A process according to claim 6 wherein the calcium phosphate-containing material is phosphate rock.

8. A process according to claim 6 wherein the surface active agent is present in an amount of 0.1 to 1.2 percent based on the calcium phosphate-containing material in the acid-decomposition reaction system.

* * * * *